(12) United States Patent
Hatti et al.

(10) Patent No.: US 7,972,053 B2
(45) Date of Patent: Jul. 5, 2011

(54) LIGHTING APPARATUS

(75) Inventors: Kiran Hatti, Chesterfield, MO (US); Srinivasa Jammalamadaka, Chesterfield, MO (US)

(73) Assignee: Nurturenergy, Inc.

( * ) Notice: Subject to any disclaimer, the term of this patent is extended or adjusted under 35 U.S.C. 154(b) by 365 days.

(21) Appl. No.: 12/188,893

(22) Filed: Aug. 8, 2008

(65) Prior Publication Data
US 2009/0251892 A1   Oct. 8, 2009

Related U.S. Application Data

(60) Provisional application No. 61/043,294, filed on Apr. 8, 2008.

(51) Int. Cl.
*F21V 7/04* (2006.01)

(52) U.S. Cl. ........ 362/628; 362/555; 362/577; 362/612; 362/630

(58) Field of Classification Search .......... 362/600–634, 362/551–582
See application file for complete search history.

(56) References Cited

U.S. PATENT DOCUMENTS

| | | |
|---|---|---|
| 4,422,719 A | 12/1983 | Orcutt |
| 4,466,697 A | 8/1984 | Daniel |
| 5,192,126 A | 3/1993 | Remeyer et al. |
| 5,237,490 A | 8/1993 | Ferng |
| 6,519,401 B1 | 2/2003 | Imamura et al. |
| 6,520,655 B2 | 2/2003 | Ohuchi |
| 6,550,952 B1 | 4/2003 | Hulse et al. |
| 6,606,439 B2 | 8/2003 | Nojiri et al. |
| 6,621,973 B1 | 9/2003 | Hoffman |
| 6,836,611 B2 | 12/2004 | Popovic et al. |
| 6,910,783 B2 | 6/2005 | Mezei et al. |
| 6,966,685 B2 | 11/2005 | Li et al. |
| 6,979,100 B2 | 12/2005 | Reiff et al. |
| 7,021,809 B2 | 4/2006 | Iwasa et al. |
| 7,114,834 B2 | 10/2006 | Rivas et al. |
| 7,217,023 B2 | 5/2007 | Iwasa et al. |
| 7,218,824 B2 | 5/2007 | Franklin et al. |
| 2002/0022686 A1* | 2/2002 | Itoh et al. ................... 524/504 |
| 2003/0174516 A1* | 9/2003 | Goto et al. .................. 362/551 |
| 2004/0066659 A1 | 4/2004 | Mezei et al. |
| 2004/0085762 A1* | 5/2004 | Iwasa et al. ................ 362/217 |
| 2006/0126346 A1 | 6/2006 | Mighetto |
| 2007/0091594 A1 | 4/2007 | Soon |
| 2008/0037280 A1 | 2/2008 | Sheng |

* cited by examiner

*Primary Examiner* — Diane I Lee
*Assistant Examiner* — William J Carter
(74) *Attorney, Agent, or Firm* — Grace J. Fishel

(57) ABSTRACT

A lighting apparatus provided in the form of a bulb for use in a solar lantern or other electrical device. The lighting apparatus includes a hollow light guide with a light reflective layer on the inside. A first and second light source such as an array of LEDs, LECs, etc. is positioned at opposite ends of the hollow light guide such the light emitted by the light sources is directed through the light guide between the inner and outer sidewalls thereof. The first and second light source are connected to a power source such as a battery.

10 Claims, 4 Drawing Sheets

US 7,972,053 B2

LIGHTING APPARATUS

This application claims priority from provisional application Ser. No. 61/043,294, filed Apr. 8, 2008, for LED Light Pipe Assembly.

BACKGROUND OF THE INVENTION

1. Field of the Invention

The present invention relates to a lighting apparatus with light emitting diodes (LEDs), light emitting capacitors (LECs) or the like as a light source that provides an efficient and substantially even light distribution in a 360 degree manner.

2. Brief Description of the Prior Art

LEDs are more efficient at producing light, last longer and are more durable than incandescent and fluorescent lamps and unlike most fluorescent light sources, LEDs generally contain no mercury. Commercially available point-source arrays of LEDs which are used, for example, in solar lights and lanterns provide a surprising amount of light output but the light from a point-source LED array is harsh and unpleasant to look at.

What is needed is an efficient LED lighting apparatus that spreads the light in a manner that the light from the individual LEDs is diffused. The same technology may also have application to LECs or the like.

BRIEF SUMMARY OF THE INVENTION

In view of the above, it is an object of the present invention to provide a lighting apparatus that makes use of a light guide to diffuse the light from opposing light sources positioned at opposite ends thereof. It is another object to provide a lighting apparatus which may be provided as a replacement bulb for use in new and existing lights. It is also an object to provide a lighting apparatus with improved energy efficiency. Other objects and features of the invention will be in part apparent and in part pointed out hereinafter.

In accordance with the invention, a lighting apparatus for providing a substantially uniformly illuminated light emitting surface includes a hollow light guide with a longitudinal axis, first and second ends and inner and outer sidewalls. A light reflective layer is provided on at least a portion of the inner sidewall and a first and second opposing lights such as LEDs, LECs or the like are positioned against the first and second ends of the light guide such that the light emitted by the opposing lights is directed into the light guide. In one embodiment, the light reflective layer is co-extruded with the light guide.

The lighting apparatus may be provided with a plug for use as a replacement bulb in a solar lantern or as a replacement light in other electrical devices. The plug may include pins, screw threads or be otherwise adapted to make electrical contact with a power source in a customary manner.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention and one possible application thereof are illustrated, corresponding reference characters refer to corresponding parts throughout the several views of the drawings in which.

DETAILED DESCRIPTION OF THE INVENTION

Figure 1:
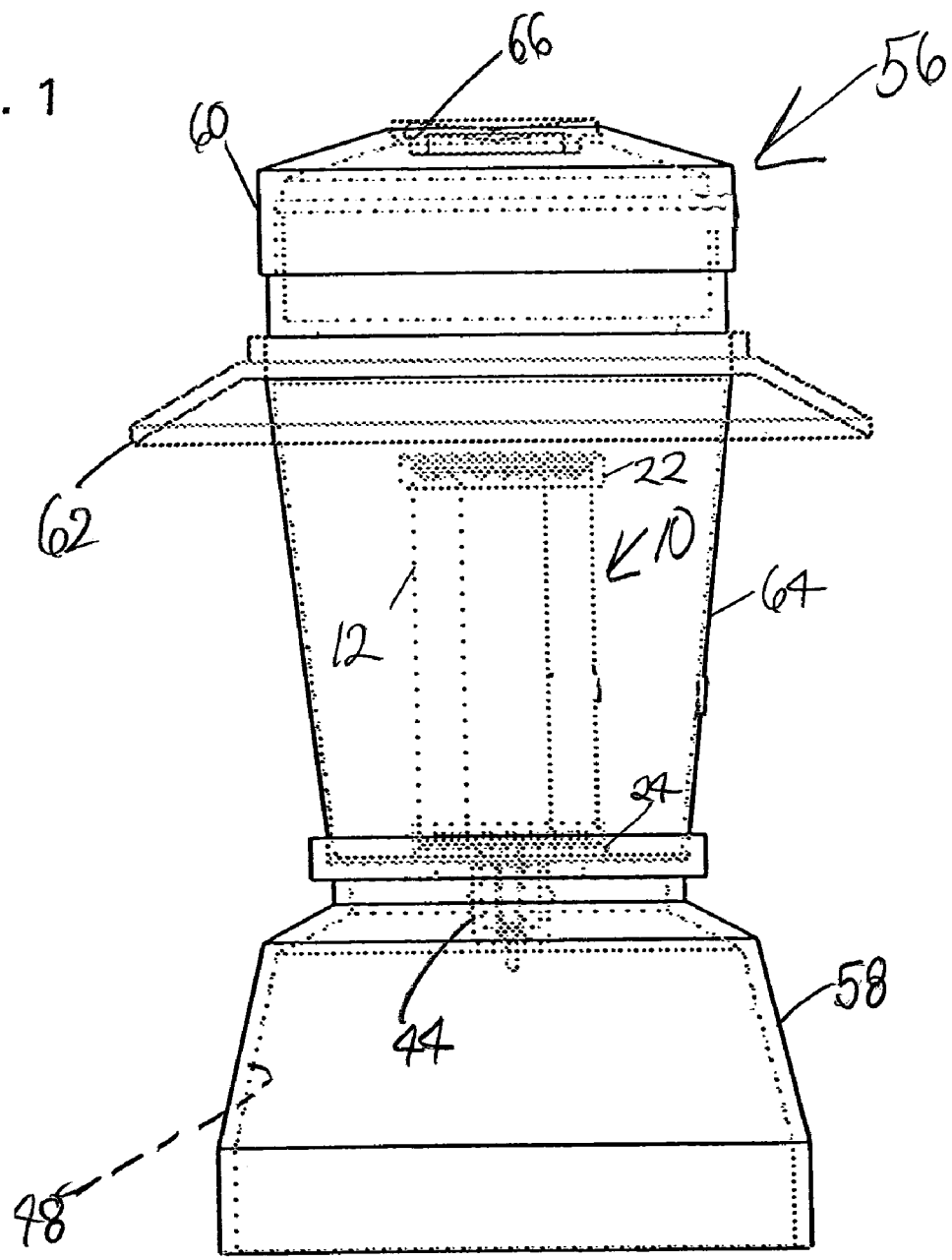
FIG. 1 is side elevation of a solar powered portable lantern wherein a lighting apparatus in accordance with the present invention is used as a bulb.
Figure 2:
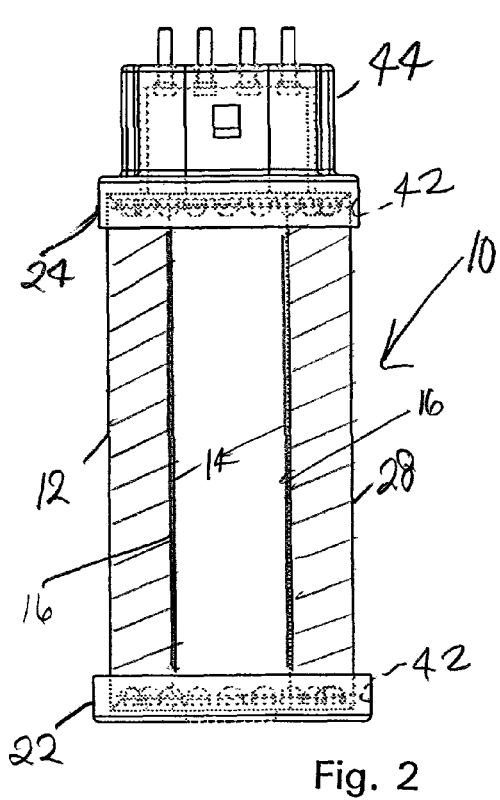
FIG. 2 is a cross-section taken along plane 2-2 in FIG. 4 of the lighting apparatus.
Figure 3:
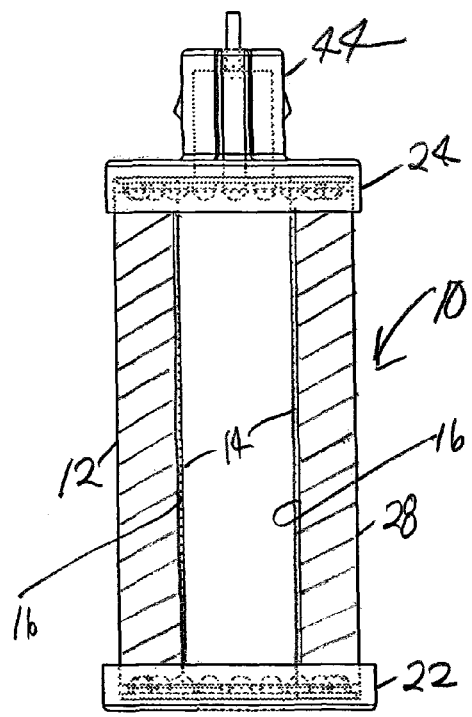
FIG. 3 is a cross-section taken along plane 3-3 in FIG. 4.
Figure 4:
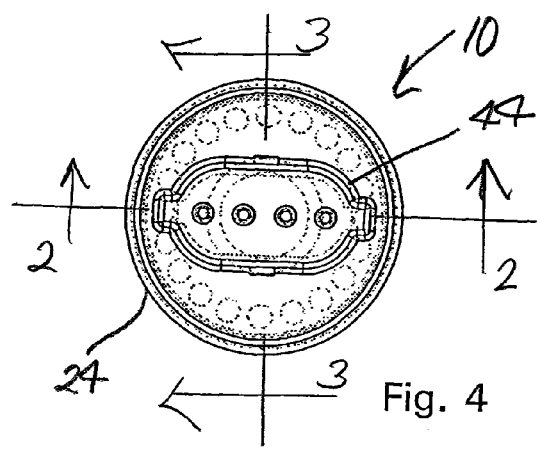
FIG. 4 is an end plan view.
Figure 5:
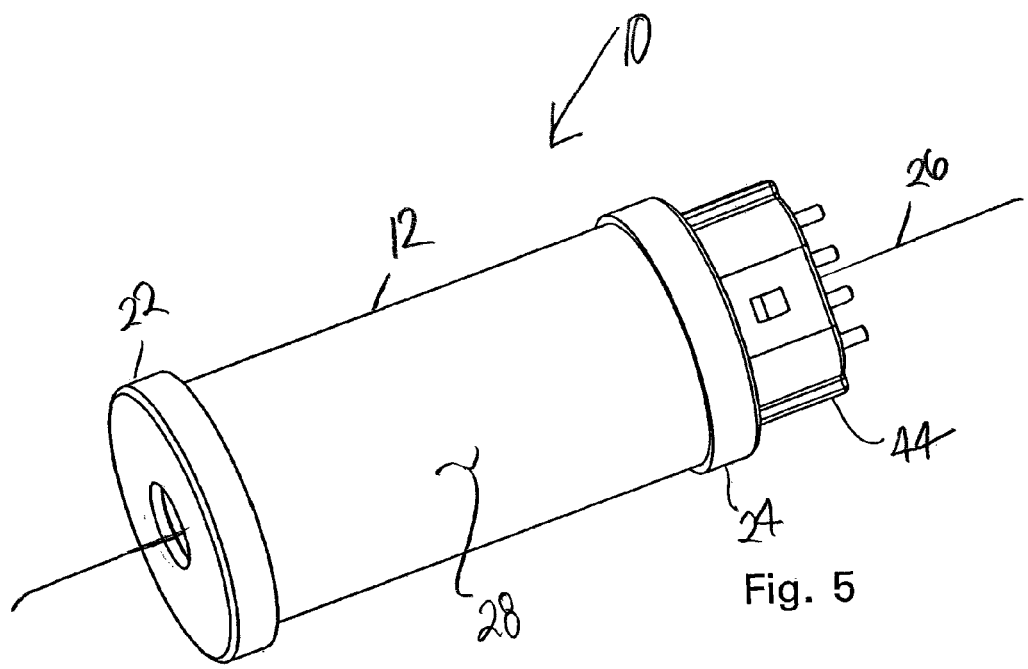
FIG. 5 is a perspective view of the LED lighting apparatus.

Referring to FIGS. 2-6 more particularly by reference character, reference numeral 10 refers to a lighting apparatus in accordance with the present invention. In major part, lighting apparatus 10 includes a hollow light guide 12 with a light reflective layer 14 on an inner sidewall 16 (FIGS. 2-3), a first and second array of LEDs 18, 20, respectively, a top cover 22 and a bottom cover 24 for fixing the LEDs against the light guide such that the light rays from the LEDs are directed through the sidewalls of the light guide.

Figure 6:
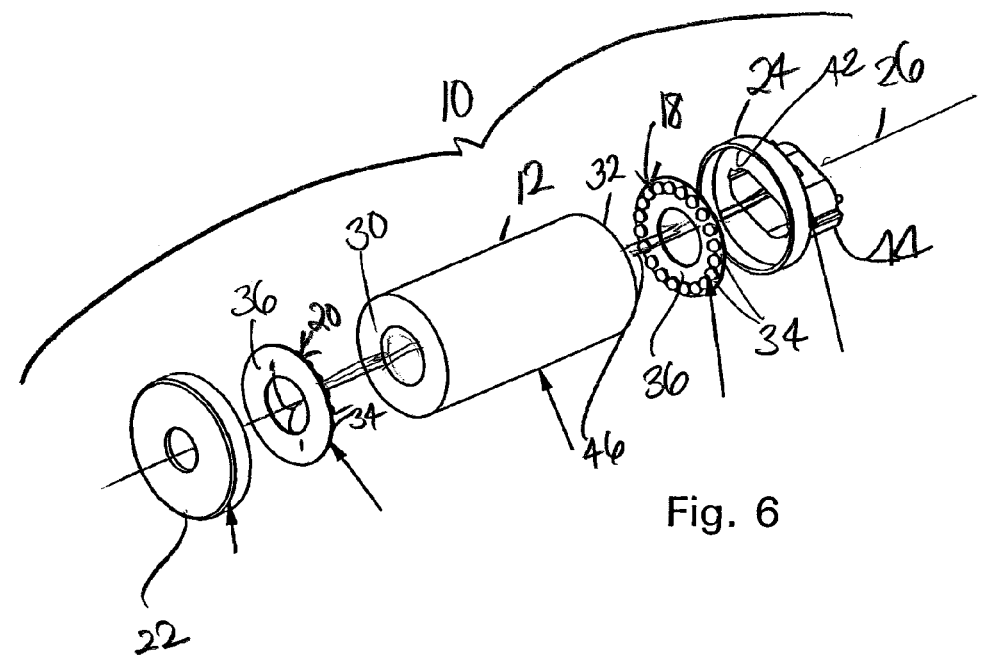
FIG. 6 is an exploded perspective view of the lighting apparatus which is shown assembled in FIG. 5.

As illustrated in the drawings, light guide 12 is cylindrical with a longitudinal axis 26, inner sidewall 16, an outer sidewall 28 and first and second ends 30, 32, respectively (FIG. 6). Light guide 12 is formed of material transmissible to light emitted from an LED such as plastic or glass. Materials commonly used for light guides include acrylics, polycarbonates, poly(methylmethacryaltes), and poly(methyl-2-methylpropenoate). These plastics are sold by the tradenames Plexiglas, Limacryl, R-Cast, Perspex, Plazcryl, Acrylex, Acrylite, Acrylplast, Altuglas, Polycast and Lucite. Acrylic, or acrylic fiber, can also be used. PMMA may be preferred because of its properties, easy handling and processing, and low cost, but PMMA is brittle when loaded, especially under an impact force. While light guide 12 is illustrated throughout the drawings as a hollow cylinder, it will be understood that it may have other shapes such as elliptical, triangular, quadrilateral, hexagonal, etc. with a similarly or differently shaped hollow core.

Light reflective layer 14 is light opaque so that light rays are not emitted from the coated surface of light guide 12 but rather are redirected back into light guide 12 and through outer sidewall 28. Light reflective layer 14 may be any type of high reflectance materials such as phosphorus inhibited acrylonitrile butadiene styrene (ABS), polycarbonate, etc. Where the coating is colored, the coating may affect the color of the light emitted from outer sidewall 28. In most instances, white is preferred. Light reflective layer 14 may be applied as a paint but when light guide 12 is extruded, and light reflective layer 14 is a polymer, reflective layer 14 is preferably co-extruded with the polymer forming light guide 12. Light reflective layer 14 may also be formed as a textured surface of grooves or the like.

Individual LEDs 34 in first and second LED arrays 18, 20 are mounted on circuit boards 36. Each board 36 is configured to support LEDs 34 in the array and connect them in an electric circuit. Low powered LEDs such as those drawing 10-75 mA may be used, in which case boards 36 may be made of fiberglass. When higher powered LEDs are use, a thermal interface material 38 may be used to attach LEDs 34 to boards 36 and boards may be formed of a heat conducting material like aluminum. LEDs 34 preferably emit white light but may emit a colored light and, if colored and if desired, the output from LEDs 34 may be color mixed to form a white light, etc. LEDs 34 may be provided with a lens 40, which may be flat, such that the light emitted is directed generally parallel to longitudinal axis 26 and through light guide 12 between inner and outer sidewalls 16, 28.

As illustrated, first and second arrays 18, 20 are positioned such that a central ray of light from LEDs 34 is directed towards the opposite end of light guide 12. The width of light guide 12 between inner and outer sidewalls 16, 28 should be at least as wide as LEDs 34 to capture and use most of the flux generated by the lights. Although not illustrated, recesses may be provided on first and ends 30, 32 for receiving LEDs 34.

Top and bottom covers 22, 24, respectively, include a recess 42 (FIGS. 2 and 6) for receipt of circuit boards 36 for holding LEDs 34 against first and second ends 30, 32 of light guide 12 such that there is substantially no air space between the surface of the LEDs and the ends of light guide 12.

Figure 7:
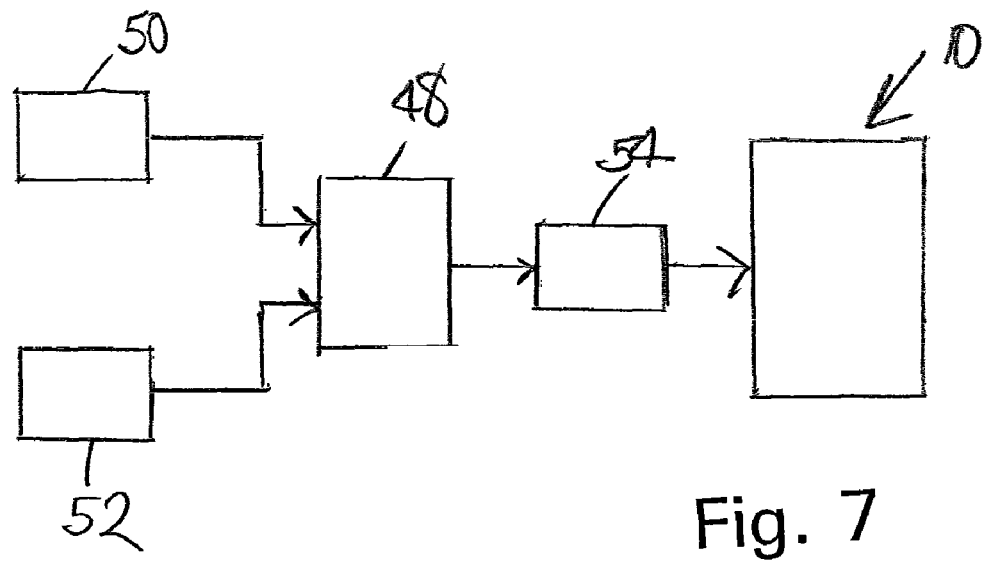
FIG. 7 is an exemplary electronic circuit that may be used with the lighting apparatus; and, FIG. 8 is a side elevation of an LED array mounted on a circuit board.
Figure 8:
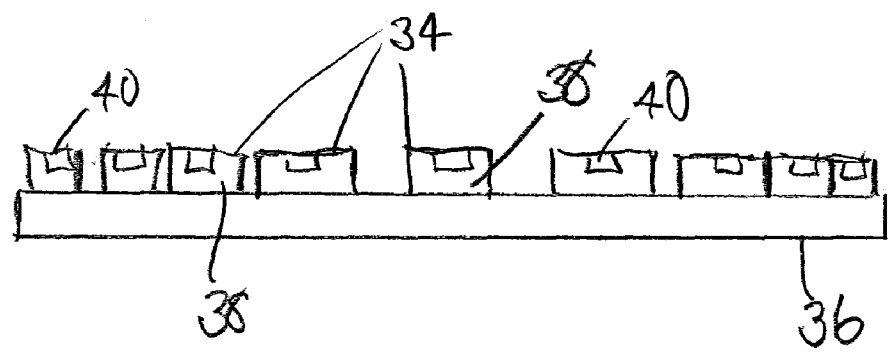

One of top and bottom covers 22, 24 is provided with a plug 44 for connection to a jack of an electric source in a conventional manner. Plug 44 is connected to one of circuit boards 36 and to a power supply line 46 (FIG. 6) passing through the hollow core of light guide 12 to the other of circuit boards 36. As shown in FIG. 7, power to circuit boards 36 may be supplied by a battery 48 which is charged by a photovoltaic cell 50 or by another charging source 52 such as alternating current power available through standard electric outlets. In other instances, AC power may be supplied directly to circuit boards 36 through an AC/DC converter. A switch 54 is provided to control (i.e., via opening or closing the circuits), the electricity flowing between the power supply and circuit boards 36.

As illustrated in FIG. 1, one possible use for lighting apparatus 10 is as the bulb in a portable solar powered lantern 56. As shown, lantern 56 includes a base 58 in which battery 48 is housed. A solar panel (not shown) may be provided for recharging battery 48. A cap 60 with a brim 62 is supported above base 58 and a cylindrical window 64 may be provided made of material that is transparent or semi-transparent to light. A handle 66 may be provided on cap 60 to allow a user to carry lantern 56. Plug 44 of lighting apparatus 10 is inserted into a jack for connecting lighting apparatus 10 to battery 48 under control of switch 54 which may be located on base 58 or cap 60. When energized, the light from individual LEDs in LED arrays 18, 20 is diffused and substantially evenly distributed in a 360 degree manner along the length of light guide 12.

In a solar powered lantern 56 as shown in FIG. 1 wherein 20 LEDs are in first and second arrays 18, 20, each of which draws 8 mA, lighting apparatus 10 provides 100 lumens of light with 3.5 watts of power consumption.

Other possible light sources such as LECs (light emitting c for lighting apparatus 10 will be apparent to those skilled in the art wherein the following may be achieved:

1. Uniform light distribution, free from hot light spots.
2. Improved energy efficiency.
3. Reduced the inventory of lantern main assemblies because it is easy to customize the lumen output per a customer order.
4. Elimination of a large printed circuit board, each LED is directly mounted on a LED holder which is attached to the light guide.
5. Better light utilization as compared to an incandescent or fluorescent light.
6. LED light guide assembly is dimmable.
7. No mercury.
8. Better heat management which improves LED life.
9. Easy to retrofit in after market solar lanterns or other appliances.
10. 360 Degree omni uniform light.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A lighting apparatus for providing a substantially uniformly illuminated light emitting surface, the apparatus comprising:
    a light guide with a hollow core, a longitudinal axis, first and second ends and inner and outer sidewalls;
    a light reflective layer on at least a portion of the inner sidewall; and,
    first and second light sources emitting light mounted on a circuit board and positioned against the first and second ends of the light guide such that the light emitted by the first and second light sources is directed through the light guide between the inner and outer sidewall,
    top and bottom covers for holding the first and second light sources against the first and second ends of the light guide, one of said top and bottom covers having a plug for electrical connection of one of the first and second light sources to an electrical power source and a power line connected to the plug and passing through the hollow core of the light guide for electrical connection of the other of the first and second light sources to the electrical power source.

2. The lighting apparatus of claim 1 wherein each first and second light source is one or more light emitting diodes or light emitting capacitors.

3. The lighting apparatus of claim 1 wherein the first light source is a first array of light emitting diodes and the second light source is a second array of light emitting diodes and wherein the light guide is cylindrical.

4. The lighting apparatus of claim 3 wherein the light emitting diodes generate a flux and have a width less than a distance between the inner and outer sidewalls such that most of the flux generated by the light emitting diodes passes into the light guide between the inner and outer sidewalls.

5. The lighting apparatus of claim 3 wherein the light emitting diodes are uniformly spaced apart in a circle in each of the first and second arrays of light emitting diodes.

6. The lighting apparatus of claim 1 wherein the light reflective layer is opaque.

7. The lighting apparatus of claim 6 wherein the light reflective layer is a high reflectance material selected from a group consisting of phosphorous inhibited acrylonitrile butadiene styrene and phosphorus inhibited polycarbonate and is co-extruded with the light guide.

8. A solar powered lantern including a rechargeable battery and a jack for connecting a lighting apparatus to the battery under control of a switch, said light apparatus comprising:
    a light guide with a hollow core, a longitudinal axis, first and second ends and inner and outer sidewalls;
    a light reflective layer on at least a portion of the inner sidewall;
    first and second arrays of light emitting diodes emitting light mounted on a circuit board and positioned against the first and second ends of the light guide such that the light emitted by the light emitting diodes is directed through the light guide between the inner and outer sidewall, top and bottom covers for holding the first and second arrays of light emitting diodes against the first and second ends of the light guide, one of said top and bottom covers having a plug for mated receipt in jack for electrical connection of one of the first and second arrays of light emitting diodes to the battery and a power line connected to the plug and passing through the hollow core of the light guide for electrical connection of the other of the first and second arrays of light emitting diodes to the battery.

9. The solar powered lantern of claim 8 wherein each of the light emitting diodes draws less than 75 mA.

10. The solar powered lantern of claim 8 wherein there are 20 light emitting diodes in each of the first and second arrays of light emitting diodes and wherein each light emitting diode draws 8 mA.

* * * * *